United States Patent [19]
Feng et al.

[11] Patent Number: 5,265,183
[45] Date of Patent: Nov. 23, 1993

[54] FIBER OPTIC CONNECTOR AND TOOL FOR ASSEMBLING SAME

[75] Inventors: David Q. Feng, Skokie; Igor Grois, Northbrook, both of Ill.

[73] Assignee: Molex Incorporated, Lisle, Ill.

[21] Appl. No.: 908,093

[22] Filed: Jul. 2, 1992

[51] Int. Cl.$^5$ .............................................. G02B 6/26
[52] U.S. Cl. ........................................ 385/78; 385/77; 385/81; 385/84; 385/134; 385/139
[58] Field of Search ................ 385/77, 78, 81, 84, 385/87, 134, 139

[56] References Cited

U.S. PATENT DOCUMENTS

| | | | |
|---|---|---|---|
| 4,190,317 | 2/1980 | Makuch | 385/81 X |
| 4,674,833 | 6/1987 | Des Forges et al. | 385/84 |
| 4,711,517 | 12/1987 | Fentress et al. | 385/78 |
| 4,813,760 | 3/1989 | Tanaka et al. | 385/81 X |
| 4,842,363 | 6/1989 | Margolin et al. | 350/96.21 |
| 5,013,122 | 5/1991 | Savitsky et al. | 350/96.20 |
| 5,088,804 | 2/1992 | Grinderslev | 385/81 |
| 5,121,455 | 6/1992 | Palecek | 385/84 |
| 5,142,598 | 8/1992 | Tabone | 385/78 |
| 5,146,525 | 9/1992 | Tabone | 385/78 |

Primary Examiner—Brian Healy
Attorney, Agent, or Firm—A. A. Tirva

[57] ABSTRACT

A fiber optic connector includes a housing having a longitudinal passage extending therethrough and having two ends. A rear end is adapted for attaching a fiber optic cable therethrough. A front end is adapted for having a mating fiber contact plug secured thereto in the passage. The plug has a fiber-receiving passage coextensive with the passage in the housing. A retaining ring is disposed in a transverse groove in the passage in the housing for abutment against the fiber contact plug near the front end thereof to secure the plug in the passage in the housing. A tool is provided for assembling the fiber optic connector. The tool includes a head for receiving and holding the housing of the connector in position with the fiber contact plug and retaining ring insertable into the passage thereof. A pusher apparatus is mounted for movement relative to the head and is engageable with the retaining ring to push the retaining ring into the groove while the connector housing is held by the head of the tool.

18 Claims, 4 Drawing Sheets

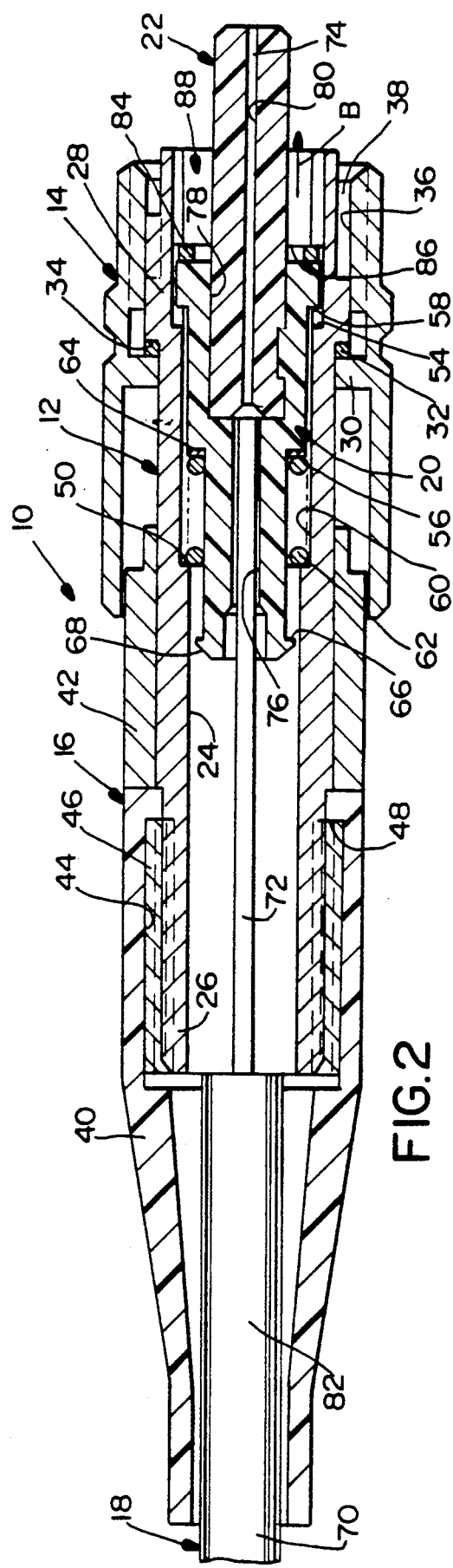
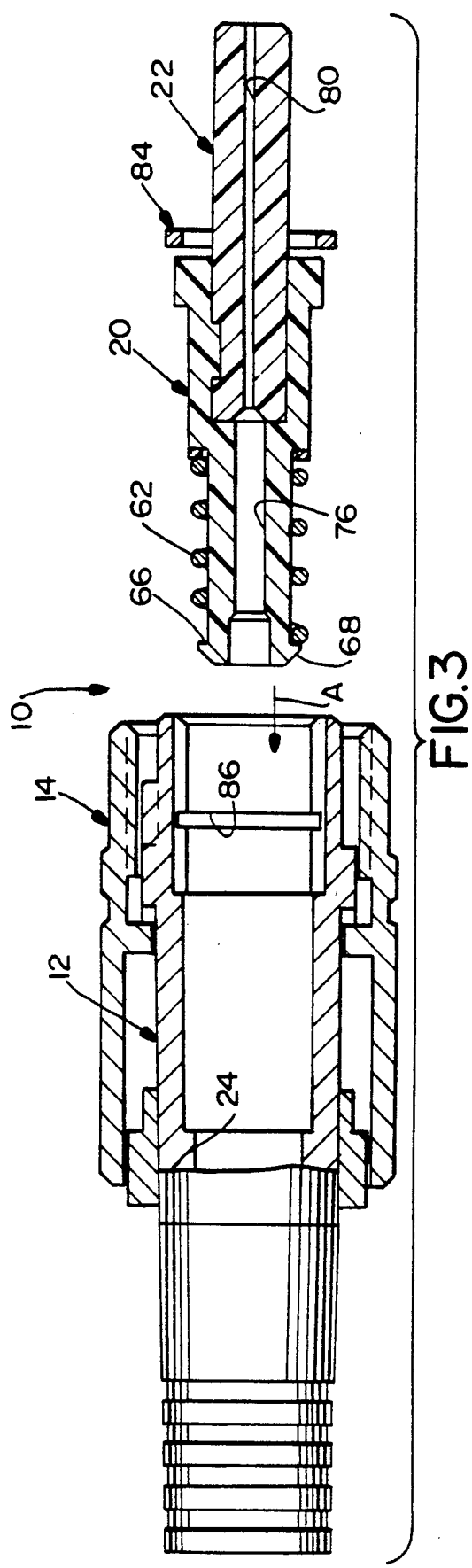
FIG.2
FIG.3

FIBER OPTIC CONNECTOR AND TOOL FOR ASSEMBLING SAME

FIELD OF THE INVENTION

This invention generally relates to the art of signal transmission cable connectors and, particularly, to a fiber optic cable connector and a tool for assembling the connector.

BACKGROUND OF THE INVENTION

Fiber optic cables have been used for some time as a means for transmitting optic signals in the field. These fiber optic cables may be interconnected one to another or to other optical devices by terminating the cable within a connector. The connector accurately aligns the cable, preferably to minimize interconnection transmission losses.

One of the problems which continues to plague the industry of optical fiber signal transmission is the complexity of fiber optic connectors as described above. Such connectors often are fabricated with an undue multiplicity of components or parts. With optical communications, fiber optic cables are interconnected extensively in the field. When a connector is designed with a multiplicity of components, these parts have to be shipped and then assembled by the installer. There is a tendency for the parts to become misplaced or lost, or it simply is difficult to manually manipulate and assemble the connectors in the field.

Another problem in this scenario involves the provision of a simple tool which can be used to facilitate field assembly of the fiber optic cable and terminating the cable within the connector.

This invention is directed to solving these problems by providing an easily assembled fiber optic cable connector, along with a complementary assembly tool.

SUMMARY OF THE INVENTION

An object, therefore, of the invention is to provide a new and improved fiber optic cable connector of the character described.

Another object of the invention is to provide a tool for assembling the connector.

In the exemplary embodiment of the invention, a fiber optic connector includes a housing having a longitudinal passage extending therethrough and having two ends. A rear end is adapted for attaching a fiber optic cable thereto. A front end is adapted for having a mating fiber contact plug secured thereto in the passage. The fiber contact plug has a fiber-receiving passage coextensive with the passage in the housing.

The invention contemplates the provision of a simple retaining ring disposed in a transverse groove in the passage in the housing for abutment against the fiber contact plug near the front end thereof to secure the plug in the passage in the housing. In the preferred embodiment of the invention, spring means are operatively associated between the fiber contact plug and the housing to bias the plug forwardly against the retaining ring.

More particularly, the housing is provided as a one-piece component. The passage in the housing, at the front end thereof, is sized for insertion of the fiber contact plug thereinto. The retaining ring is resiliently contractible for insertion into the passage and resiliently expandable into the groove. The retaining ring is disclosed as having a generally C-shape. A mating ferrule is secured in a recess in a front end of the mating fiber contact plug. The ferrule projects from the front end of the plug and has a fiber passage coextensive with the passage in the plug.

In the exemplary embodiment of the invention, the tool for assembling the fiber optic connector includes a head for receiving and holding the housing of the connector in position with the fiber contact plug and retaining ring insertable into the housing passage. A pusher apparatus is mounted for movement relative to the head and is engageable with the retaining ring to push the retaining ring into alignment with the groove in the passage of the connector housing, while the housing is held by the head of the tool.

As disclosed herein, the pusher apparatus of the tool is provided as a piston element of a piston and cylinder device, with the head of the tool being mounted at one end of the cylinder and the piston element being movable within the cylinder toward the head. The piston element projects from the opposite end of the cylinder of manual manipulation thereof. A manually graspable handle is secured to the piston outside the opposite end of the cylinder. As disclosed, the handle is telescoped over the outside of the opposite end of the cylinder.

The head of the assembly tool includes coupling means for interengagement with a coupling ring of the fiber optic connector. In the disclosed embodiment, the coupling means is provided in the form of external threads on the head for interengagement with a complementarily internally threaded coupling ring of the fiber optic connector.

The head of the assembly tool further includes a passageway coextensive with the passage in the connector housing, and the pusher apparatus is movable axially into the passageway to push the retaining ring therewith into the groove in the passage of the connector housing. The passageway in the head is tapered to compress or contract the retaining ring radially, whereby the retaining ring can expand into the groove. The head includes a radially outwardly opening slot for insertion therethrough of the retaining ring into the passageway from outside the head.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an axial section through the fiber optic connector in fully assembled condition;

FIG. 3 is an axial section through the connector, in disassembled condition, and with the cable boot removed;

DETAILED DESCRIPTION OF THE PREFERRED EMBODIMENT

Figure 1:
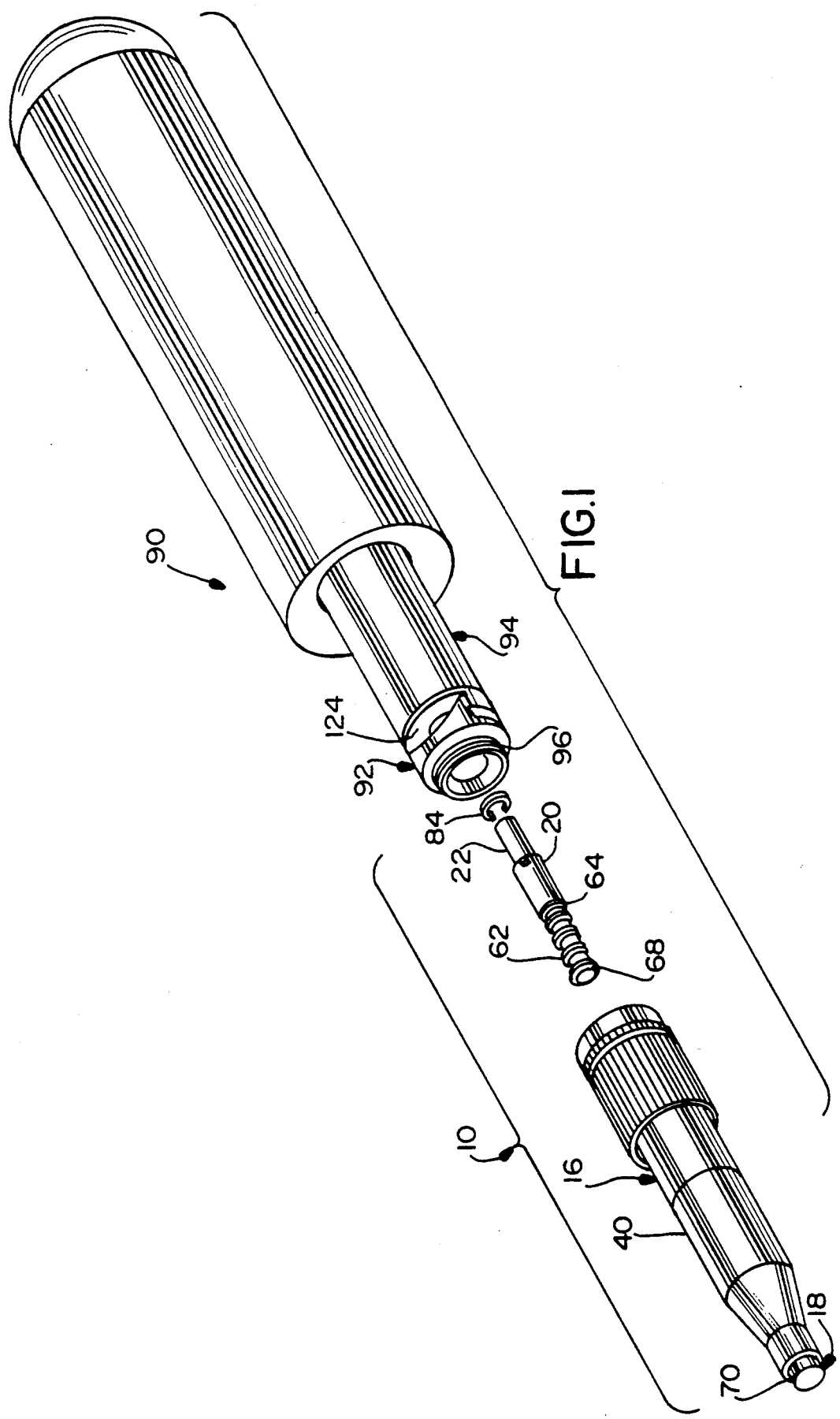
FIG. 1 is an exploded perspective view of a fiber optic connector and its assembly tool embodying the concepts of the invention.

Referring to the drawings in greater detail, and first to FIGS. 1-3, the invention is embodied in a fiber optic connector, generally designated 10, which includes a one-piece housing, generally designated 12, about which a coupling ring, generally designated 14, is mounted at the front end of the housing. A flexible boot, generally designated 16, is secured to the rear end of the housing. The boot facilitates attaching a fiber optic cable, generally designated 18, to the rear of the housing. A fiber contact plug, generally designated 20, is mounted within the front end of the housing, with a mating ferrule, generally designated 22, projecting from the front end of fiber contact plug 20, as well as housing 12, for mating with a fiber ferrule of a complementary mating fiber optic connector (not shown).

More particularly, one-piece housing 12 of fiber optic connector 10 includes a longitudinal passage 24 extending therethrough. The housing has a rear end 26 adapted for attaching fiber optic cable 18 thereto, by means of boot 16, and a front end 28 adapted for having fiber contact plug 20 secured thereto in a front end of passage 24.

The outside of housing 12 is generally cylindrical, and coupling ring 14 is assembled onto the rear of the housing prior to assembling boot 16 thereto. A forward limit position of the coupling ring relative to the housing is shown in FIG. 2, wherein an internal annular flange 30 inside the coupling ring engages a washer 32 sandwiched between the flange and an outside annular shoulder 34 of the housing. Generally, the coupling ring includes coupling means for interengagement with coupling means of an adapter (not shown). Specifically, the coupling ring is provided with internal threads 36 which define a gap 38 between the inside of the internally threaded ring and the outside of housing 28 immediately near the front distal end of the housing. Connector 10 is mated with the complementary fiber optic connector by inserting an externally threaded cylindrical mating end of the adapter into gap 38 and rotating coupling ring 14 to mate the connector to the adapter. Of course, other coupling means than the threaded interconnections could be used, such as a rotatable bayonet-and-pin connection or the like.

Flexible boot 16 is generally cylindrical and is telescoped over rear end 26 of housing 12. The boot includes a tapered flexible rear portion 40 and a cylindrical, relatively rigid front portion 42. The front portion is more rigid so that coupling ring 14 may engage therewith. The front portion is secured to the rear portion and/or the outside of housing 12 by appropriate means, such as adhesive or the like. Rear portion 40 has an internal annular recessed area 44 within which a crimp nut 46 is disposed. The boot is assembled onto the rear end 26 of housing 12, once crimp nut 46 is clamped and deformed onto rear end 26 of the housing. The boot cannot move rearwardly because of the abutment of a shoulder 48 of the boot engaging the crimp nut.

As stated above, mating fiber contact plug 20 is secured within passage 24 of housing 12 within front end 28 of the housing. More particularly, passage 24 has a stepped configuration defined by an inner annular shoulder 50 and an inner annular shoulder 54. Fiber contact plug 20 has an opposing stepped configuration defined by an outer annular shoulder 56 and an outer annular shoulder 58. Shoulders 54 and 58 on the housing and the fiber contact plug, respectively, define an axial limit position of movement of the plug relative to the housing. Shoulders 50 and 56 on the housing and the plug, respectively, define a passage area 60 within which a coil spring 62 is disposed and sandwiched between the shoulders. Actually, the front end of the coil spring abuts against a washer 64 which, in turn, abuts against shoulder 56 of the plug. As seen best in FIG. 3, in unassembled condition, coil spring 62 is expanded and bears against washer 64 and a rear, forwardly facing annular shoulder 66 at the rear distal end of fiber contact plug 20 to hold the spring onto the plug prior to assembly and so that the sprinq does not become lost or misplaced during shipping, handling or assembly. It can be seen that the rear end of the plug is tapered or chamfered, as at 68, to facilitate assembling the coil spring onto the plug. Washer 64 may be a "split" ring for similar assembly.

As is conventional, fiber optic cable 18 includes an outer jacket 70, strength member Kevlar 71, an inner buffer fiber 72 and the actual optical fiber 74, all of which are shown in FIG. 1. The jacketed portion of the cable extends at least into flexible boot 40. The boot may be secured to the cladded portion of the cable by appropriate means, such as flexible adhesive or the like. Buffered fiber 72 extends forwardly into passage 24 of housing 12 and into a fiber-receiving passage 76 in the rear end of fiber contact plug 20. Mating ferrule 22 is disposed in a recess 78 at the front end of the plug, and the ferrule has a fiber passage 80 therethrough. Passage 24 in housing 12, fiber-receiving passage 76 in fiber contact plug 20 and fiber passage 80 in ferrule 22 all are coextensive and concentrically aligned with a major axis 82 which extends centrally through the entire fiber optic cable 10.

Figure 4:
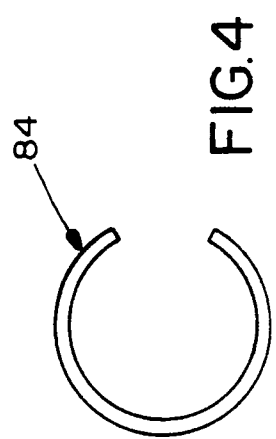
FIG. 4 is an elevational view of the retaining ring of the connector.

In assembly, and in order to secure fiber contact plug 20 (along with ferrule 22) within housing 12, the subassembly of the housing and ferrule (along with coil spring 62) are inserted axially into the housing in the direction of arrow "A" (FIG. 3). The subassembly is inserted to the position shown in FIG. 2, whereat coil spring 62 is compressed to bias the subassembly axially outwardly in the direction of arrow "B". The invention contemplates that this subassembly be retained within the housing by a retaining ring 84 which seats within a groove 86 in the passage through housing 12. Groove 86 is best shown in FIG. 3. Retaining ring 84 is best shown in FIG. 4 wherein it can be seen that the retaining ring is generally C-shaped so that the ring is contractible for insertion into the passage of connector housing 12 and is resiliently expandable for snapping outwardly into groove 86 to secure fiber contact plug 20 in the passage in assembled condition as shown in FIG. 2, with coil spring 62 compressed. Lastly, it should be noted that, when assembled, an annular gap, as at 88 (FIG. 2), is provided outside of ferrule 22 and inside of housing 12 to afford access for retaining ring 84 to be inserted, along with fiber contact plug 20, into the housing by an appropriate tool.

Figure 5:
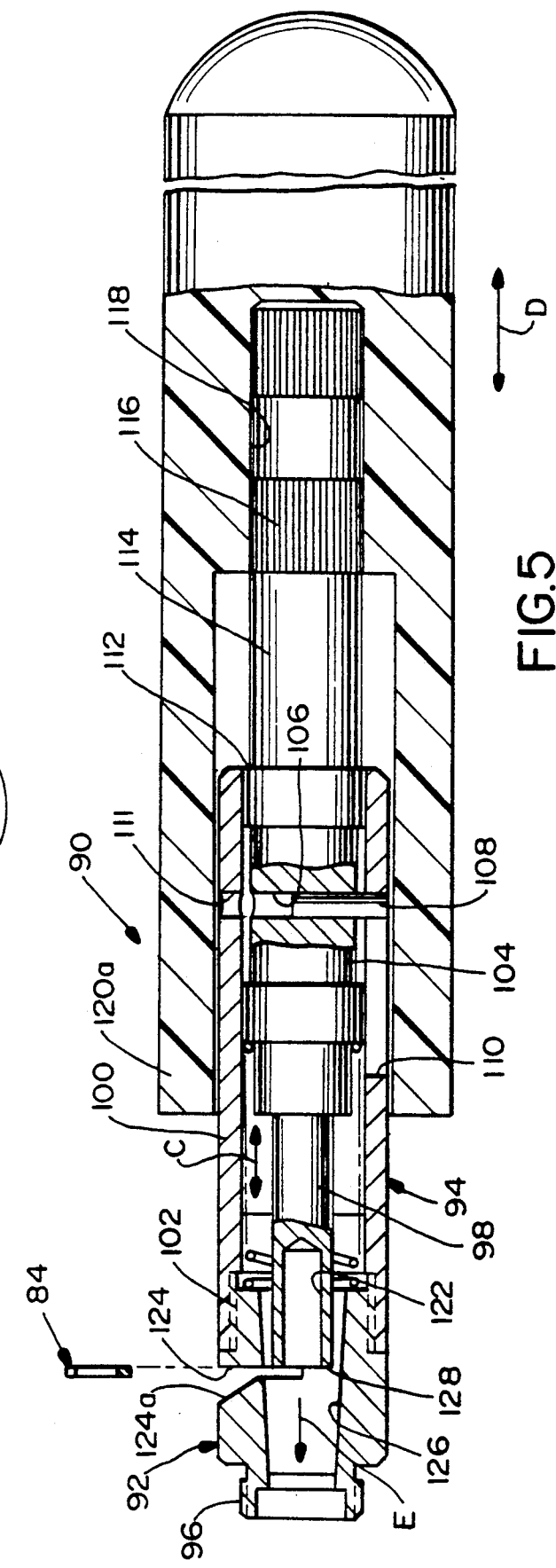
FIG. 5 is a fragmented axial section of the assembly tool of the invention.

Referring to FIG. 5, an assembly tool, generally designated 90, is provided for assembling fiber optic connector 10. Generally, the tool includes a head, generally designated 92, for receiving and holding the connector, particularly the housing and coupling ring thereof, in position for receiving fiber contact plug 22 and retaining ring 84. The tool further includes a pusher apparatus, generally designated 94, mounted on head 92 for movement relative thereto. Generally, the pusher apparatus is adapted for engaging the subassembly of fiber contact plug 20 and ferrule 22 to push the subassembly into assembled condition within the connector housing, and simultaneously pushing retaining ring 84 into alignment with groove 86 within the housing.

More particularly, head 92 includes an externally threaded front portion 96, with the external threads mateable with internal threads 36 of coupling ring 14 of the connector. Therefore, housing 12 and coupling ring 14 can be mounted onto the head by a simple threaded engagement. Of course, other coupling means, such as a bayonet-and-pin or other coupling means could be appropriately used. Referring back to FIG. 2, threaded front end 96 of head 92 is insertable into gap 38 of the connector.

Pusher apparatus 94 is in the form of a piston-and-cylinder device which includes a piston element 98 reciprocally mounted for movement in the direction of double-headed arrow "C" within a cylinder 100. The rear end of head 96 and the front end of cylinder 100 are complementarily externally and internally threaded, respectively, as at 102, to mounted the head onto the front end of the cylinder. Piston 98 has an enlarged intermediate area 104 with a diametral hole 106 for receiving a cross pin 108. The pin projects outwardly into an axially elongated slot 110 in cylinder 100 to effectively mount the piston reciprocally within the cylinder and allow relative limited axial movement therebetween. The cylinder has a hole 111 in a wall thereof for assembly or disassembly of the pin. The pin can be press-fit in hole 106 in the piston.

Piston 98 projects outwardly of a rear end 112 of cylinder 100, as at 114, and has a knurled rear distal end 116 which is fixed within a closed hole 118 of a manually graspable handle 120. A front end 120a of the handle is telescoped over the outside of cylinder 100. Therefore, as the handle is moved in the direction of arrow "D", while head 92 and cylinder 100 are held stationary, piston 98 effectively is moved in the direction of double-headed arrow "C" relative to the head and the housing of connector 10 which is fixed to the head.

The front end of piston 98 is provided with an axial recess 122 which is sized and configured for receiving the front end of ferrule 22 secured within recess 78 of fiber contact plug 20. Therefore, the fiber contact plug and ferrule are movable axially relative to the housing and the coupling ring of the connector in response to relative axial movement between piston 98 and the interconnected head 92 and cylinder 100.

Head 92 is provided with a radially outwardly opening slot 124 for insertion therethrough of retaining ring 84. One side 124a of slot 124 is tapered or chamfered to facilitate insertion of the retaining ring. Once inserted, the retaining ring will be positioned within the bounds of a passageway 126 extending axially through head 92. The passageway is sized and configured so that the retaining ring is insertable completely within the passageway and in abutment with a front face 128 of piston 98 about recess 122 at the front of the piston. It should be noted that passageway 126 in head 92 is tapered toward the forward end of the head, in the direction of arrow "E", whereby the walls of the passageway converge radially inwardly. The passageway is generally cylindrical, and with the progressively inwardly tapering walls, the passageway is effective to contract C-shaped retaining ring 84 as piston 98 pushes the ring in the direction of arrow "E".

Figure 6:
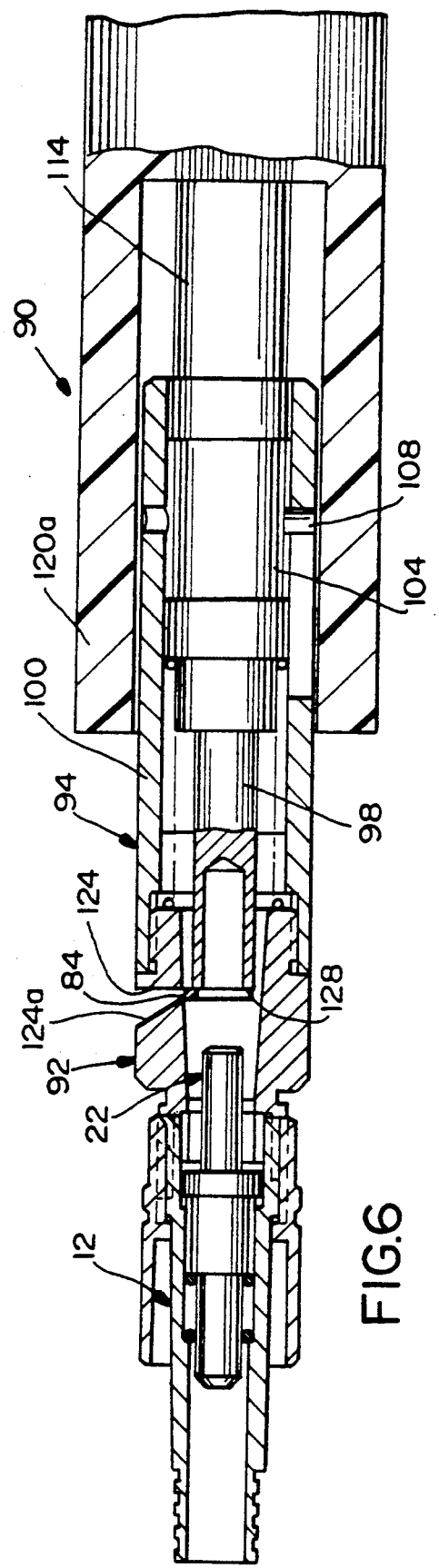
FIG. 6 is an axial section of the connector and the assembly tool in an initial position of assembly, with the coupling ring of the connector coupled to the head of the tool.
Figure 7:
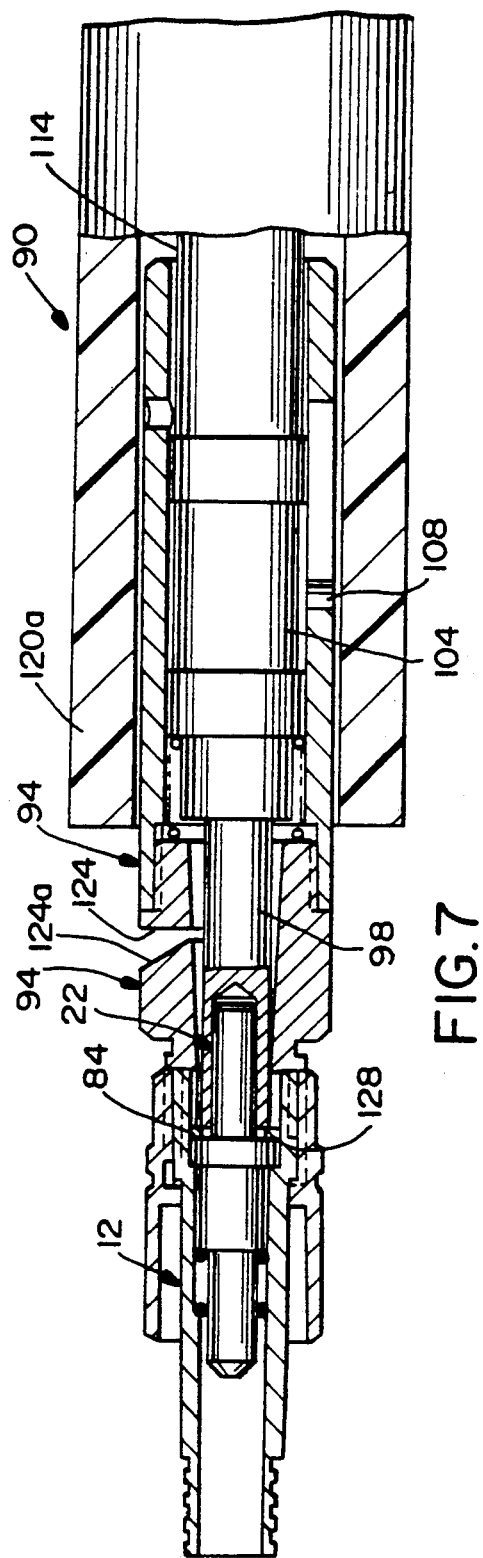
FIG. 7 is a view similar to that of FIG. 6, with the tool having been operated to fully assemble the connector.

FIGS. 6 and 7 show the assembly operation of fiber optic connector 10 using assembly tool 90. Although most of the assembly operations already have been described above in relation to the description of connector 10 and tool 90, it should be noted that the subassembly of fiber contact plug 20 and ferrule 22 first are inserted into the tool to the position shown in FIG. 6. Connector housing 12 then is secured to head 92 by threading coupling ring 14 onto the externally threaded end 96 of the head. Retaining ring 84 then is inserted into slot 124 of the head so that the ring is within the bounds of tapered passageway 126 within the head. An operator then grasps handle 120 while holding the assembled connector housing and/or coupling ring, and the operator pushes the handle forwardly to push the retaining ring forwardly within tapered passageway 126 until the retaining ring reaches the location of groove 86, whereupon the ring will resiliently expand and "snap" into the groove. The connector now is fully assembled.

It should be understood that the assembly tool may be used to assemble any two or more parts which are to be held together with a retaining ring and that the invention may be embodied in other specific forms without departing from the spirit or central characteristics thereof. The present examples and embodiments, therefore, are to be considered in all respects as illustrative and not restrictive, and the invention is not to be limited to the details given herein.

What we claim is:

1. In a fiber optic connector which includes a housing having a longitudinal passage extending therethrough and having two ends, a rear end for attaching a fiber optic cable thereto and a front end for having a mating fiber contact plug secured thereto in said passage, the fiber contact plug having a fiber-receiving passage coextensive with the passage in the housing, wherein the improvement comprises a retaining ring disposed in a transverse groove in the passage in the housing for abutment against the fiber contact plug near the front end thereof to secure the plug in the passage in the housing.

2. In a fiber optic connector as set forth in claim 1, including spring means operatively associated between the fiber contact plug and the housing to bias the plug forwardly against the retaining ring.

3. In a fiber optic connector as set forth in claim 1, wherein said housing comprises a one-piece component.

4. In a fiber optic connector as set forth in claim 1, wherein the passage in the housing at said front end thereof is sized for insertion of the fiber contact plug thereinto, said retaining ring being resiliently contractible for insertion into the passage and resiliently expandable into said groove.

5. In a fiber optic connector as set forth in claim 5, wherein said retaining ring is generally C-shaped.

6. In a fiber optic connector as set forth in claim 1, including a mating ferrule secured in a recess in a front end of the mating fiber contact plug, the ferrule projecting from the front end of the plug and having a fiber passage coextensive with the passage in the plug.

7. A fiber optic connector, comprising:
one-piece housing having a longitudinal passage extending therethrough and having two ends, a rear end for attaching a fiber optic cable thereto and a front end;
a mating fiber contact plug in the front end of the passage through the housing the plug having a fiber-receiving passage coextensive with the passage in the housing and including a mating ferrule secured in a recess in a front end of the plug, the ferrule projecting from the front end of the plug and having a fiber passage coextensive with the passage in the plug;
a retaining ring disposed in a transverse groove in the passage in the housing for abutment against the fiber contact plug near the front end thereof to secure the plug in the passage in the housing, the retaining ring being radially resilient whereby the ring is resiliently contractable for insertion into the passage in the housing and resiliently expandable into said groove; and
spring means operatively associated between the fiber contact plug and the housing to bias the plug forwardly against the retaining ring.

8. A tool for assembling a fiber optic connector which includes a housing having a longitudinal passage with a mating fiber contact plug insertable into the passage and a retaining ring insertable into the passage behind the plug for engagement in a groove in the passage to secure the plug in the passage, comprising:
a head for receiving and holding the housing of the connector in position with the fiber contact plug and retaining ring insertable into the passage of the housing; and
a pusher apparatus mounted for movement relative to the head and engageable with the retaining ring to push the retaining ring into the groove while the connector housing is held by the head.

9. The tool of claim 8 wherein said pusher apparatus comprises a piston element of a piston-and-cylinder device, with the head being mounted at one end of a cylinder of the device, the piston element being movable within the cylinder toward the head.

10. The tool of claim 9 wherein the piston element projects from the opposite end of the cylinder for manual manipulation thereof.

11. The tool of claim 10, including a manually graspable handle secured to the piston outside the opposite end of the cylinder.

12. The tool of claim 11 wherein said handle is telescoped over the outside of said opposite end of the cylinder.

13. The tool of claim 8 wherein said head includes coupling means for interengagement with a coupling ring of the fiber optic connector.

14. The tool of claim 13 wherein said coupling means comprises external threads on the head for interengagement with a complementarily internally threaded coupling ring of the fiber optic connector.

15. The tool of claim 8 wherein said head includes a passageway coextensive with the passage in the connector housing when the housing is mounting on the head, and the pusher apparatus is movable axially into the passageway to push the retaining ring therewith into said groove.

16. The tool of claim 15 wherein said passageway is tapered to compress the retaining ring radially whereby the retaining ring can expand into said groove.

17. The tool of claim 16 wherein said head includes a radially outwardly opening slot for insertion therethrough of the retaining ring into the passageway from outside the head.

18. The tool of claim 8 wherein said head includes a passageway coextensive with the passage in the connector housing and a radially outwardly opening slot for insertion therethrough of the retaining ring into the passageway from outside the head.

* * * * *